United States Patent [19]
Carrender et al.

[11] Patent Number: 5,850,187
[45] Date of Patent: Dec. 15, 1998

[54] INTEGRATED ELECTRONIC TAG READER AND WIRELESS COMMUNICATION LINK

[75] Inventors: Curt L. Carrender, Placeitas; Jeremy A. Landt, Santa Fe; Donald F. Speirs, Fairview, all of N. Mex.

[73] Assignee: Amtech Corporation, Dallas, Tex.

[21] Appl. No.: 623,327

[22] Filed: Mar. 27, 1996

[51] Int. Cl.⁶ .................................................. H04Q 1/00
[52] U.S. Cl. ................... 340/825.54; 340/572; 235/472; 705/28; 705/23; 705/22; 455/84; 455/82
[58] Field of Search .............. 340/572, 825.54, 340/505, 825.06; 342/42, 44, 50, 51; 375/200, 206; 235/472, 385, 375, 380, 439; 364/192; 705/28, 23, 22; 455/84, 82

[56] References Cited

U.S. PATENT DOCUMENTS

| | | | |
|---|---|---|---|
| 3,984,835 | 10/1976 | Kaplan et al. | 342/44 |
| 4,242,663 | 12/1980 | Slobodin | 235/380 |
| 4,288,689 | 9/1981 | Lemelson et al. | 235/435 |
| 4,636,950 | 1/1987 | Caswell et al. | 340/825.54 X |
| 4,656,463 | 4/1987 | Anders et al. | 340/572 |
| 4,688,026 | 8/1987 | Scribner et al. | 340/572 |
| 4,786,907 | 11/1988 | Koelle | 342/51 |
| 4,912,471 | 3/1990 | Tyburski et al. | 342/42 |
| 5,008,661 | 4/1991 | Raj | 340/825.54 |
| 5,030,807 | 7/1991 | Landt et al. | 342/44 X |
| 5,051,741 | 9/1991 | Wesby | 340/825.49 |
| 5,053,774 | 10/1991 | Scheurmann et al. | 342/44 |
| 5,194,860 | 3/1993 | Jones et al. | 340/870 |
| 5,216,233 | 6/1993 | Main et al. | 235/472 |
| 5,298,894 | 3/1994 | Cerny et al. | 340/870 |
| 5,305,008 | 4/1994 | Turner et al. | 342/44 |
| 5,339,339 | 8/1994 | Petitclerc et al. | 376/245 |
| 5,382,784 | 1/1995 | Eberhardt | 235/472 |
| 5,450,087 | 9/1995 | Hurta et al. | 342/42 |
| 5,450,088 | 9/1995 | Meier et al. | 342/51 |
| 5,455,575 | 10/1995 | Scheurmann | 342/42 |
| 5,539,775 | 7/1996 | Tuttle et al. | 375/200 |
| 5,610,596 | 3/1997 | Petitclerc | 340/825.06 X |
| 5,617,084 | 4/1997 | Sears | 340/870 |
| 5,640,002 | 6/1997 | Ruppert et al. | 235/472 |
| 5,659,303 | 8/1997 | Adair, Jr. | 340/870 |

*Primary Examiner*—Brian Zimmerman
*Assistant Examiner*—William H. Wilson, Jr.
*Attorney, Agent, or Firm*—Fish & Richardson P.C.

[57] ABSTRACT

A method and apparatus for object identification which includes a portable electronic tag reader having a transceiver capable both of reading identification information from electronic tags and transmitting collected information to a base unit for remote analysis. The system of the present invention utilizes the same transceiver to receive information from the base unit and write data to read/write electronic tags. The system of the present invention includes a transceiver for generating a modulated or unmodulated radio frequency interrogation signal, a receiver for detecting a return signal from an electronic tag and a signal processor for processing the return signal. A modulator within the portable unit combines the identification data with the radio frequency interrogation signal for transmission to a base unit through a wireless local area network. A demodulator within the portable unit extracts data and commands received from a base unit for local processing or transfer to a read/write electronic tag. In one embodiment, the portable electronic tag reader includes a user interface for initiating commands and a user display for displaying status information associated with the reading, downloading, or uploading processes.

27 Claims, 14 Drawing Sheets

INTEGRATED ELECTRONIC TAG READER AND WIRELESS COMMUNICATION LINK

This invention relates generally to object identification systems, and more particularly to portable object identification systems and methods for communicating with a remote host system.

BACKGROUND OF THE INVENTION

Shipping containers, pallets, railroad cars, automobiles and the like need to be identified while they are in use. Systems for remote identification using active or passive "tags" which backscatter modulate a continuous wave reflecting a modulated signal with a digital identification code have been described in U.S. Pat. Nos. 4,739,328, and 4,888,591, assigned to the same assignee as this invention. The backscatter modulated signal is received, usually by the same system which transmitted the original signal (source), and the digital code is demodulated and decoded, providing identity information which may be processed as desired.

In many applications of these systems, the objects seeking to be identified are located in an environment which does not facilitate the use of a fixed reader system. In these kinds of systems, a portable reader may be employed to recover object data, and thereafter communicate that data with a base unit located remotely. Accordingly, the portable reader must be able to store the information recovered (for uploading at a future time) or alternatively be fitted with a transmission source for real time transmission of the information back to a base unit.

One good example is in a cargo ship environment. Typically, cargo ships transport containers which may be destined for off loading at various ports along the cargo ship's route. It would be desirable to be able to attach to each shipping container an electronic tag which identified the destination port for each container, to assist loading the cargo ship and to assure the proper off loading of each container. A portable unit capable of reading the electronic tag information would be desirable in such an environment. Ideally, such a portable reader would be capable of (1) reading the identification information stored in the tag associated with a given container and (2) displaying the relevant information upon a successful read. In addition, the portable unit should be small (hand held), operate on minimum power and be capable of transmitting the information to a base unit for processing in real time.

In the past, many different techniques for transferring identification information from a portable reader have been used. For example, a separate reader transceiver and transmitter radio is employed. The reader transceiver interrogates the electronic tags, obtaining the identification information, and a separate transmitter radio is used to link the information to a base (host) unit. Alternatively, the portable unit may store information collected during the read process and upload it by placing the portable unit in a "docking station". In docking station systems, the portable unit is required to store all the gathered information until a upload occurs.

While both of these solutions provide a means for transmitting the identification information out of the portable unit, neither solution is optimal. Specifically, multi-radio systems are costly and bulky due to the duplication of radio components. Docking station systems do not permit real time processing. In addition, the memory storage required in the portable units is costly, takes up space and increases the power consumption.

What is desired is to provide a portable unit which includes a transceiver capable of interrogating electronic tags and reading identification information returned from them, and which utilizes the same transceiver to transmit the gathered information to a host computer for remote analysis. In addition, the portable unit should be capable of receiving commands and data from the host computer and able to write data to read/write electronic tags.

BRIEF DESCRIPTION OF THE INVENTION

The present invention is directed to a method and apparatus for object identification which includes a portable electronic tag reader having a transceiver capable both of reading identification information from electronic tags and transmitting collected information to a base unit for remote analysis. The system of the present invention utilizes the same transceiver to receive information from the base unit and write data to read/write electronic tags. The system of the invention includes a transceiver for generating a modulated or unmodulated radio frequency interrogation signal, a receiver for detecting a return signal from an electronic tag and a signal processor for processing the return signal. A modulator within the portable unit combines the identification data with the radio frequency interrogation signal for transmission to a base unit through a wireless local area network. A demodulator within the portable unit extracts data and commands received from a base unit for local processing or transfer to a read/write electronic tag. In one embodiment, the portable electronic tag reader includes a user interface for initiating commands and a user display for displaying status information associated with the reading, downloading, or uploading processes.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, served to explain the principles of the invention.

DETAILED DESCRIPTION

Figure 1:
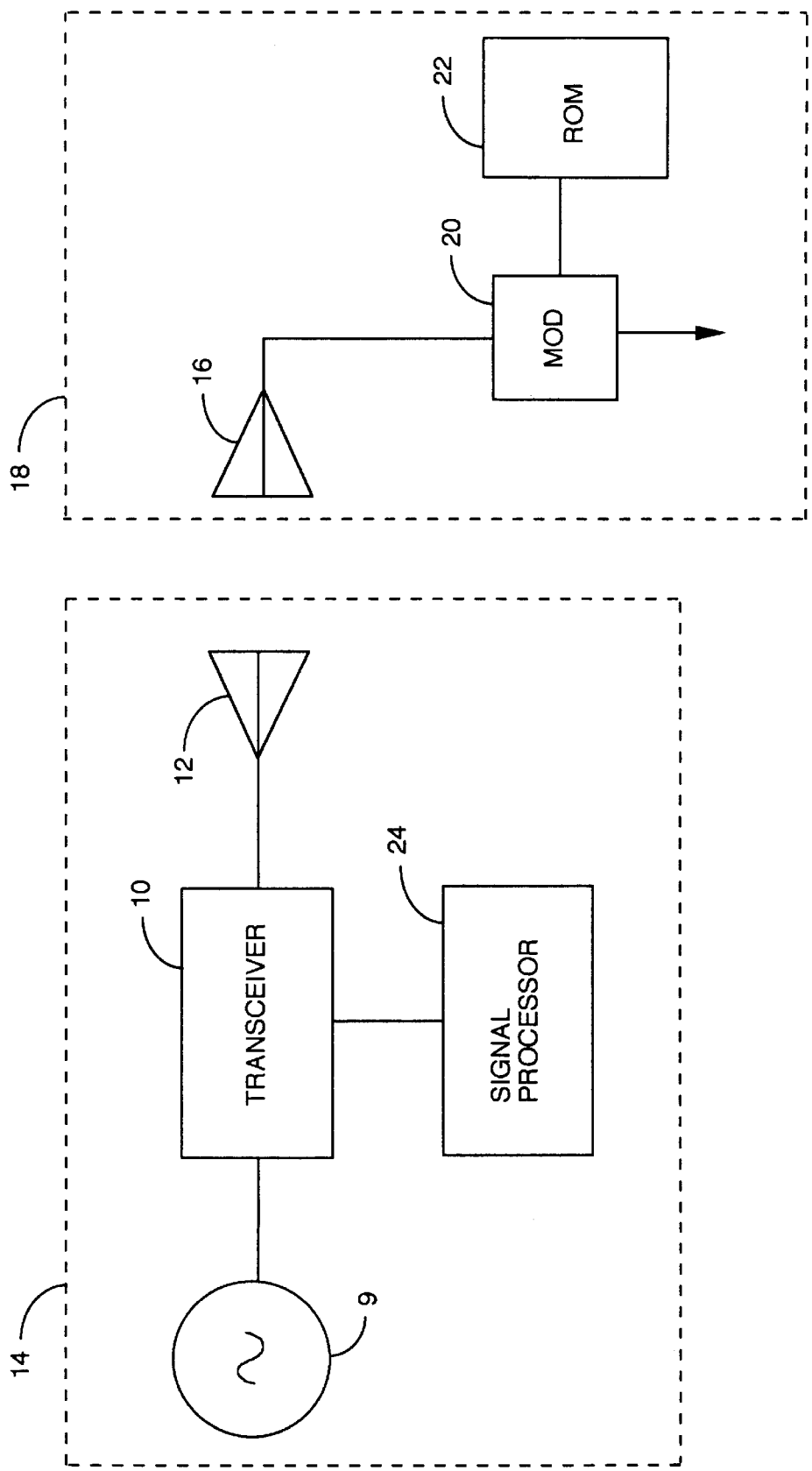
FIG. 1 is a schematic diagram of a prior art identification system.

Referring to FIG. 1, a source 9 for generating and interrogating radio frequency (RF) signals is connected to a transceiver 10 at a reader, generally indicated at 14. The interrogating RF signal from the source 9 may have a suitable frequency such as 915 MHz. When the source 9 is energized, transceiver 10 transmits the interrogating RF signal through antenna 12 to a suitable antenna 16 (such as a dipole antenna) in an electronic tag (transponder) 18. The transponder 18 is associated with an object (not shown) and is used to identify the object. The transponder 18 includes a data source such as a read-only memory (ROM) 22, which provides a sequence of binary 1's and binary 0's in an individual pattern to identify the object.

A binary "1" in the ROM 22 causes a modulator (MOD) 20 to produce a first plurality of signal cycles and a binary "0" in the ROM 22 causes the modulator 20 to produce a second plurality of signal cycles different from the first plurality of signal cycles. The plurality of signal cycles sequentially produced by the modulator 20 to represent the pattern of binary 1's and binary 0's which identify the object are introduced to the dipole antenna 16 for reflection to antenna 12 at reader 14.

Antenna 12 introduces the received signals to transceiver 10 for processing by signal processor 24. Signal processor 24 produces signals in a sequence identifying the pattern of the 1's and 0's in ROM 22 at transponder 18. The sequence may be compared in reader 14 with a desired sequence to determine whether the object being identified is being sought by the reader or not.

The system described above represents the prior art on a simplified basis. Such a system is disclosed in U.S. Pat. No. 4,075,632, issued on Feb. 21, 1978 to Howard A. Baldwin, Steven W. Depp, Alfred R. Koelle and Robert W. Freyman and assigned of record to the United States of America as represented by the U.S. Department of Energy. The assignee of record of this invention has obtained rights from the U.S. government under U.S. Pat. No. 4,075,632 to make, have made, use and sell the invention of that patent.

Figure 2:
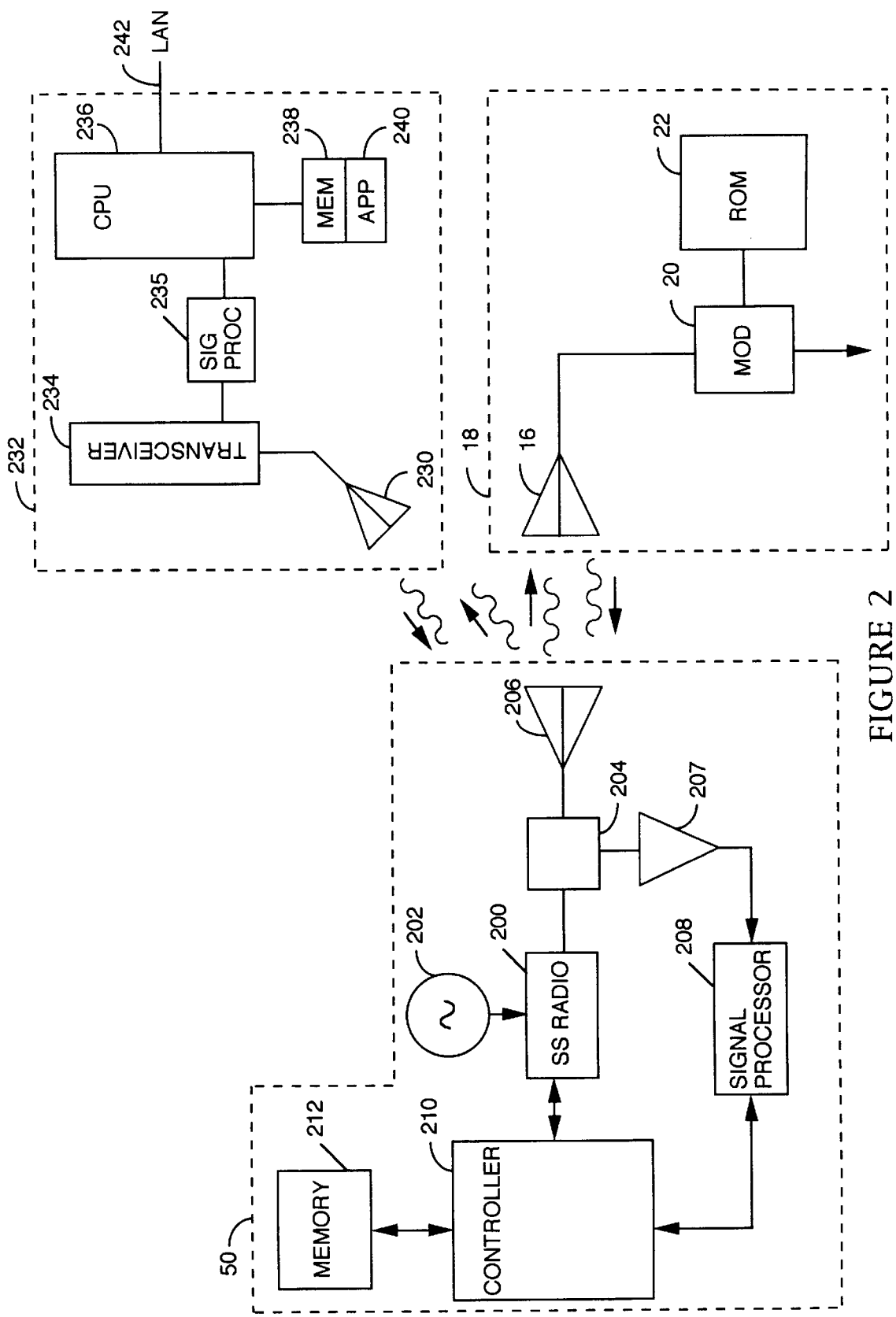
FIG. 2 is a schematic diagram of an identification system according to one embodiment of the present invention.

The system of the present invention employs a reader 50 which is shown in detail in FIG. 2, and which may be considered to be similar to that shown in FIG. 1 and described above. Reader 50 generates an interrogation signal for transmission to an electronic tag (transponder) 18.

Reader 50 includes a radio transceiver, which may be a spread spectrum radio 200, receiver 204, antenna 206, signal processor 208 and controller 210. The spread spectrum radio 200 is coupled by a transmission line to receiver 204, which in turn is coupled to antenna 206. In one embodiment, antenna 206 is a directional antenna. Alternatively, antenna 206 may include both an omnidirectional antenna (whip antenna or the like) and a directional antenna (Yagi, microstrip patch or the like). In this configuration, a control signal is generated by controller 210 to couple spread spectrum radio 200 to the appropriate antenna depending on the application (e.g. coupled to the omnidirectional antenna during uploading operations and coupled to the directional antenna during tag reading and downloading operations).

Spread spectrum radio 200 receives a control signal (receive data enable) from controller 210 for initiating the transmission of an interrogation signal from spread spectrum radio 200 through receiver 204 and antenna 206 to a suitable antenna 16 at an electronic tag (transponder 18).

Transponder 18 is associated with an object (not shown) and is used to identify the object. Transponder 18 includes a data source such as a ROM 22 which provides a sequence of binary 1's and binary 0's as an individual pattern to identify the object.

A binary "1" in ROM 22 causes modulator 20 to produce a first plurality of signal cycles, and a binary "0" in ROM 22 causes modulator 20 to produce a second plurality of signal cycles different from the first plurality of signal cycles. The plurality of signal cycles sequentially produced by modulator 20 represent the pattern of binary 1's and binary 0's which identify the object. These cycles are introduced to the antenna 16 for reflection to antenna 206 at reader 50.

In one embodiment, transponder 18 may be a read/write electronic tag which includes a detector (not shown) coupled to antenna 16 for detecting modulated write signals received from reader 50. The write signals may include data to be written to the data source in transponder 18. Accordingly, in one embodiment, the data source may be a random access memory (RAM) capable of read and write functions. The write sequence to transponder 18 will be described in greater detail below in association with transfers of data from the host computer to the reader.

Antenna 206 introduces the received signals to receiver 204 for processing by signal processor 208. In one embodiment, receiver 204 is a homodyne receiver. Signal processor 208 produces signals in a sequence having a pattern identifying the pattern of 1's and 0's in ROM 22 at transponder 18. The sequence is transferred to a controller 210 in reader 50 which compares the sequence with a desired sequence stored in a memory 212, associated with controller 210, to determine whether the object being identified is being sought by the reader or not.

Once the comparison is made, the controller 210 may display the information to a user operating the reader 50 by means of a display (not shown), or conversely may transfer the information through a wireless local area network (LAN) connection to a host computer. Specifically, controller 210, upon identification of a sequence for transmission, will transfer the sequence to spread spectrum radio 200. Spread spectrum radio 200 receives the sequence (transmit data or TXDATA), modulates it and provides a direct sequence spread spectrum signal for transmission through receiver 204 and antenna 206 to a suitable antenna 230 in a host computer 232.

Host computer 232 includes transceiver 234, signal processor 235, central processing unit (CPU) 236 and associated memory unit 238. Transceiver 234 receives and decodes the direct sequence spread spectrum signal (receive data) and transmits the received data to signal processor 235 for data manipulation. Signal processor 235 includes one or more registers for storing received data and may include registers for storing identification information associated with objects being sought by the host computer 232. Memory unit 238 includes software applications 240 for execution by CPU 236 for processing data received from remote units and for initiating data transfers from host computer 232 to remote readers. Applications 240 associated with the host computer 232 may compare the data received from reader 50 with desired sequences stored in host computer 232 to determine whether or not the object being identified is being sought by the host computer 232 or not. In addition, host computer 232 includes a LAN connection 242 for communicating to other host computers in a computing system.

Host computer 232 may facilitate the comparison or manipulation of data sequences processed by reader 50 by transmitting data through transceiver 234 and antenna 230 to antenna 206 in reader 50. Alternatively, host computer 232 may transfer data to reader 50, which may be subsequently written to transponder 18 as part of a write operation associated with a read/write tag. The data transferred from host computer 232 is received by spread spectrum radio 200 and demodulated for use by controller 210 and/or storage in memory 212. The data may be in the form of object identification sequences for matching at the remote location, or new or revised templates for storage in memory 212, or directions to the reader operator associated with the next operation to be performed. Alternatively, the data may include both a command to initialize a write sequence to transponder 18 and associated data to be written to the transponder.

In one embodiment of the present invention, host computer 232 is configured to process data sequences from a plurality of readers. In this embodiment, applications 240 include methods for handling multiple streams of data.

Figure 3:
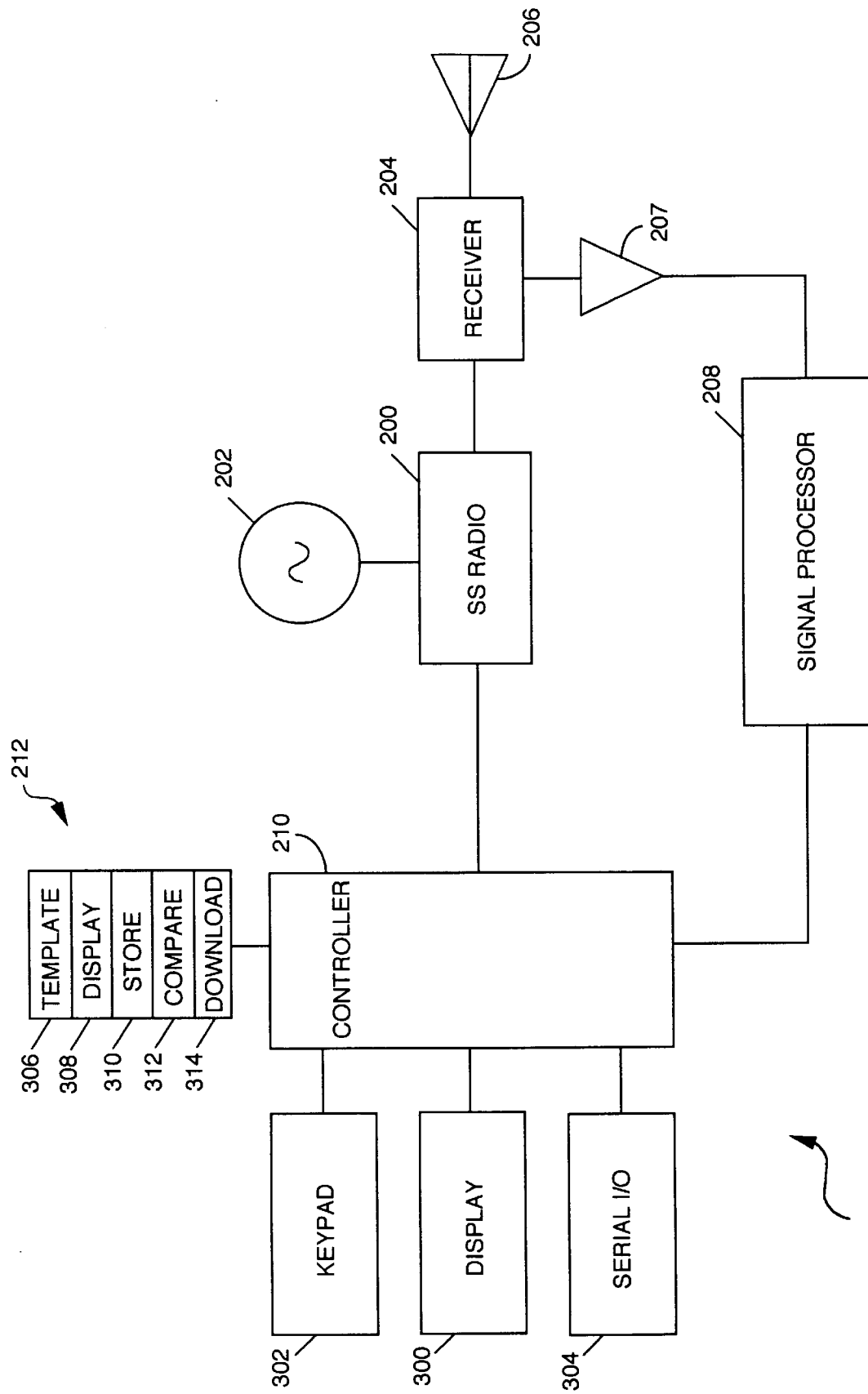
FIG. 3 is a schematic diagram of a reader according to one embodiment of the present invention.

Referring now to FIG. 3 which shows reader 50 in more detail, reader 50 includes a display 300, keypad 302 and serial I/O interface 304 for communicating with a local user of reader 50. Memory 212 further includes templates 306 for use in displaying information collected by the reader from a object. Templates 306 are electronic forms for displaying the data received from (or associated with) an electronic tag, and may include identification data, time, and date information, as well as command options (store, upload, download, etc.) for selection by the user. In one embodiment, serial I/O interface 304 receives a trigger signal from a manual trigger device (not shown) to select a function indicated by display 300 or alternatively to initiate the interrogation of an object. Keypad 302 is coupled to controller 210 for receiving keystroke commands from a user operating reader 50. Display 300 displays status information associated with interrogations of objects and also status information associated with communications with host computer 232.

Memory 212 includes one or more executable sub routines associated with handling data. Specifically, a display routine 308 will display the data for reading by a user. Alternatively, storage routine 310 may be invoked to store a frame of data for uploading at a future time. A comparison routine 312 may be initiated to compare retrieved data with a predetermined list of sequences stored in memory 212 to determine if a frame of data is associated with a desired object. Data may be transmitted to a host computer for further processing as is required by executing the upload routine 314. Alternatively, a download routine 316 may be executed to download information to transponder 18 (FIG. 2).

Figure 4:
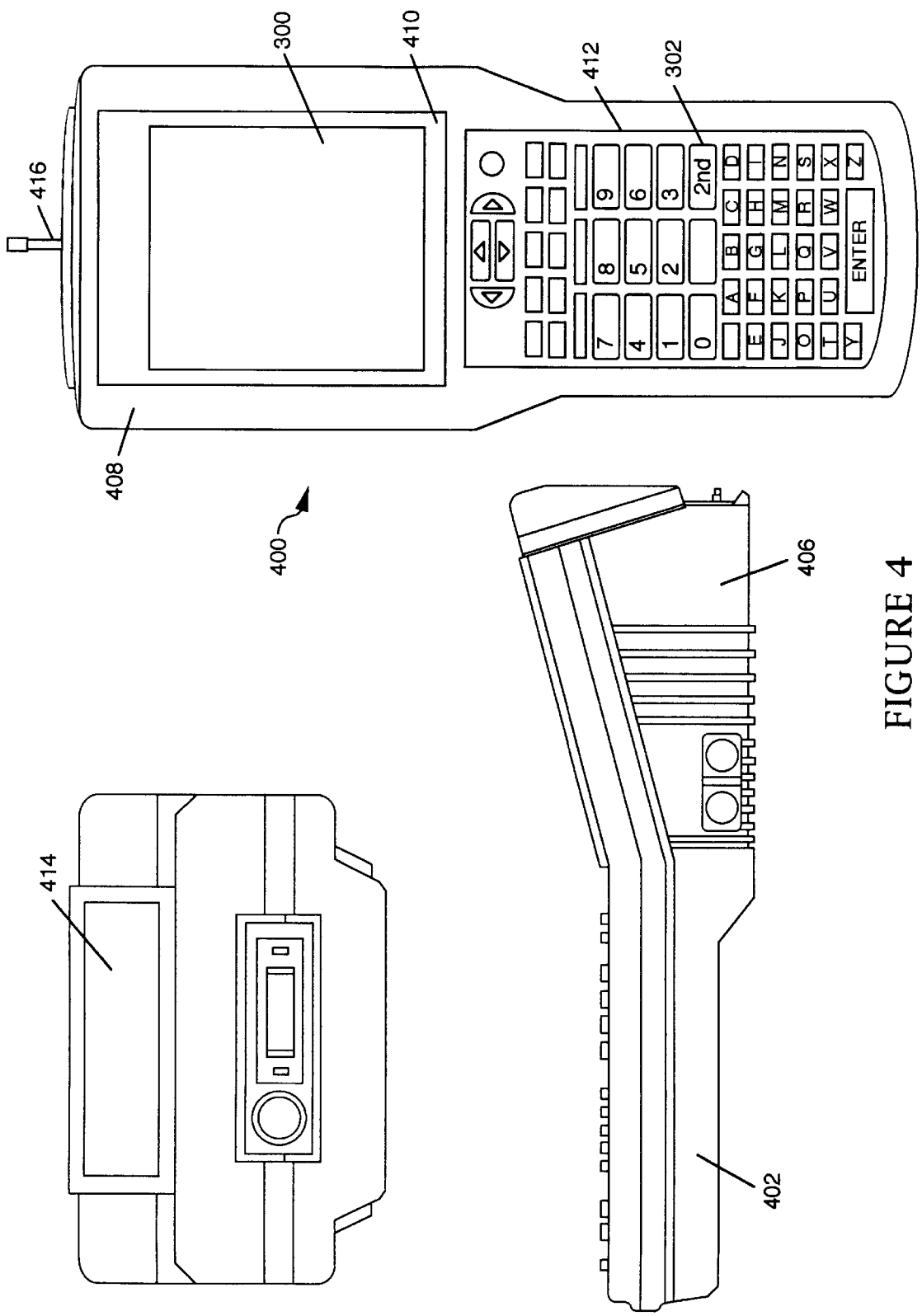
FIG. 4 is a perspective view of a reader housing according to one embodiment of the present invention.

Referring now to FIG. 4, in one embodiment of the invention, reader 50 (FIG. 2) is packaged in a hand held base unit generally indicated at 400, which includes a handle portion 402, a trigger 404 (not shown) and a body portion 406. The base unit 400 includes a top surface 408 which includes cutouts 410 and 412 for receiving display 300 and 302 respectively. Body portion 406 includes a forward face which is roughly perpendicular to top surface 408 which includes a window 414 for allowing the transmission and reception of radio frequency signals. In one embodiment, antenna 206 includes a telescoping portion (416) which may be deployed for better signal reception.

Figure 5:
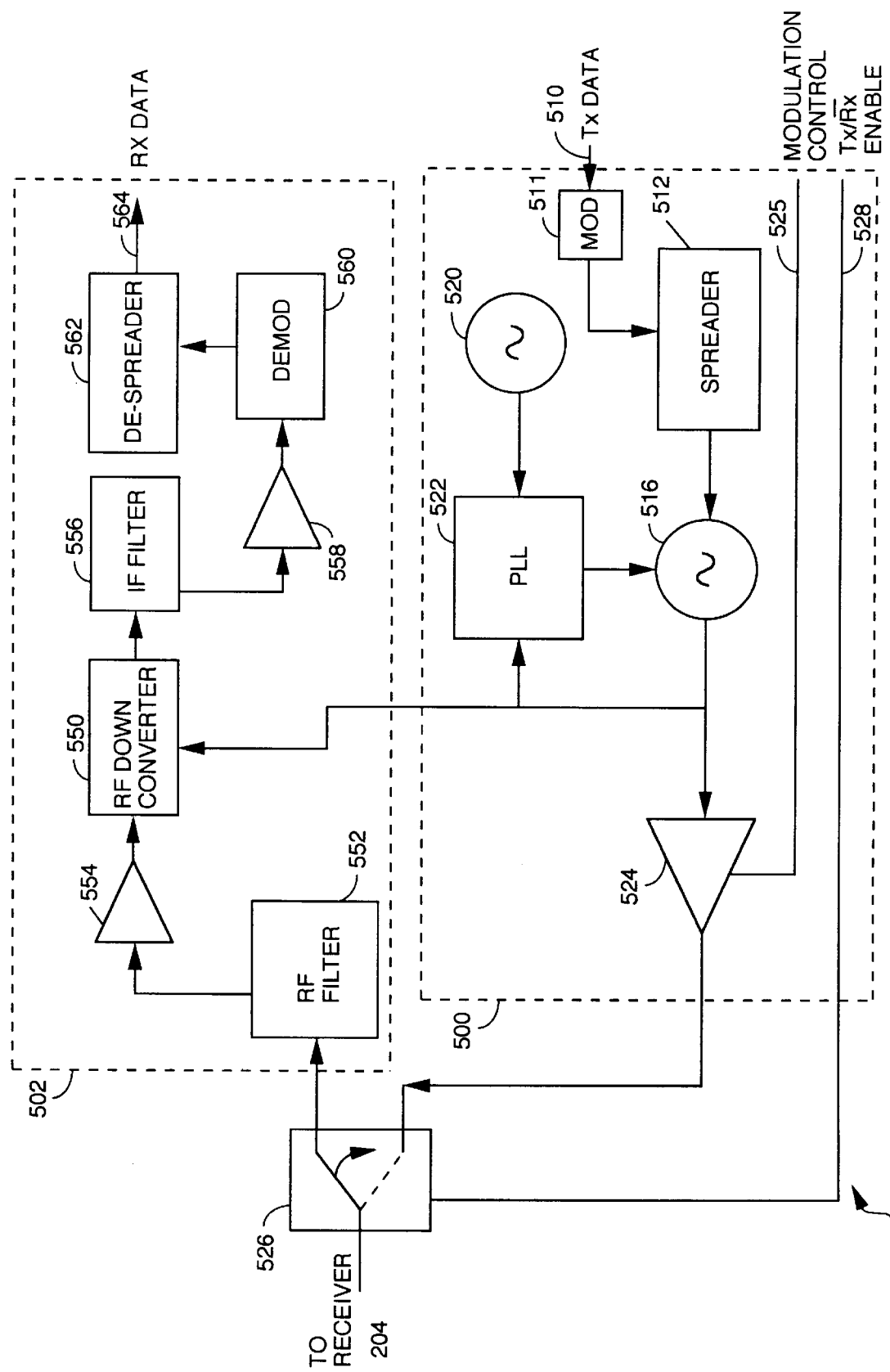
FIG. 5 is a schematic diagram of a transceiver according to one embodiment of the present invention.

Referring to FIG. 5, a detailed block diagram of spread spectrum radio 200 is shown. Spread spectrum radio 200 includes a transmit side, generally indicated at 500, and a receive side generally indicated at 502. Transmit side 500 includes a transmit data (TXDATA) port 510 for receiving baseband data to be transmitted from controller 210 (FIG. 2) to a host computer. TXDATA port 510 is coupled to an input of a modulator 511 whose output is coupled to a spreader 512. The baseband information received at TXDATA port 510 is modulated by modulator 511, resulting in an intermediate frequency (IF) signal which is the combination of the baseband data and an IF carrier. Spreader 512 combines the IF signal with a spreading signal resulting in a spread IF signal. In one embodiment, spreading signal is a pseudonoise (PN) signal. While the invention has been described with a particular ordering of the signal processing steps, the spreading and modulation functions may be interchanged in the sequence. The output of spreader 512 is introduced as an input to a RF oscillator 516.

An oscillator 520 provides an input to a phase lock loop 522 whose output is introduced into the RF oscillator 516. The output of RF oscillator 516 is fed back as an input to the phase lock loop 522 and as an input to an RF down converter 550 in the receive side 502 of spread spectrum radio 200. The feedback of the output signal from RF oscillator 516 acts as a control signal to vary the output of the phase lock loop 522 as required. In addition, the output of the RF oscillator 516 is provided to the RF down converter 550 in order to down convert (strip out the RF signal) received data signals from a host computer 232 (FIG. 2).

The output of RF oscillator 516 is introduced into a RF amplifier 524 which in turn is coupled to a duplexor 526. A modulation control signal 525 from controller 210 (FIG. 2) is coupled to RF amplifier 524. The modulation control signal may be utilized to modulate the output signal from the transmit side for use during download operations (writes to a read/write transponder). Duplexor 526 is an RF switch which is toggled by a receive enable (TX/rx enable) signal 528 generated by controller 210 (FIG. 2). The common port of duplexor 526 is coupled to an input of receiver 204 (FIG. 3) which in turn is coupled to antenna 206 (FIG. 3). Accordingly, when the transmit and receive enable signal 528 is high, the common port of duplexor 526 is coupled to the output of RF amplifier 524 enabling transmission of data from spread spectrum radio 200.

In operation, the transmit side transmits both interrogation and data signals for receipt by an electronic tag 18 (FIG. 2), and data signals for receipt by host computer 232 (FIG. 2). In one embodiment, an interrogation signal is comprised of a spread carrier signal generated by modulator 511 and spreader 512 in the absence of transmit data. Alternatively, controller 210 (FIG. 2) may provide a sequence of all "0's" or all "1's" or another optimized pattern. In one embodiment, a unique pattern of 1's and 0's is provided which may be detected by detector 207 (FIG. 2) to discriminate invalid RF signals which are received by antenna 206 (FIG. 2). In one embodiment, the interrogation signal is modulated by enabling and disabling modulation control signal 525, thereby providing a modulated output signal which may be read by a detector in a read/write electronic tag. Interrogation signals are transmitted by disabling receive enable signal 528 from duplexor 526, enabling transmission of data through antenna 206 (FIG. 2) to an electronic tag 18 (FIG. 2).

The transmit side is used to forward data received from the host computer 232 for transmission to transponder 18. Host computer 232 may download information to be written to transponder 18 by transmitting data through transceiver 234 and antenna 230 to antenna 206 in reader 50. The data transferred from host computer 232 is received by spread spectrum radio 200 and demodulated for use by controller 210. Controller 210, upon receipt of a download command from the host computer (as indicated by the data received), will initialize a write sequence to transponder 18.

The write sequence begins by disabling receive enable signal 528 to spread spectrum radio 200 (FIG. 2) (by controller 210 in FIG. 2). In one embodiment, the data to be transferred is encoded by modulating the spread spectrum carrier wave generated by the transmit side of the spread spectrum radio. Specifically, download routine 318 (FIG. 3) encodes the data to be transferred to transponder 18 by varying the output of modulation control signal 525 to RF amplifier 524. This results in a on-off cycling of the spread spectrum carrier signal output to transponder 18 which may be detected and decoded by a detector in transponder 18. Thereafter, the data may be written to RAM for storage.

Alternatively, the transmit side may upload object information retrieved from electronic tags 18 (FIG. 2). The upload routine begins by disabling the receive enable signal 528 to spread spectrum radio 200 by controller 210 (FIG. 2). The baseband data is introduced to TXDATA port 510 which in turn is coupled to an input of a modulator 511 whose output is coupled to a spreader 512. The baseband information received at TXDATA port 510 is modulated by modulator 511, resulting in an intermediate frequency (IF) signal which is the combination of the baseband data and an IF carrier. Spreader 512 combines the IF signal with a spreading signal resulting in a spread IF signal. The output of spreader 512 is coupled to RF oscillator 516 whose output is introduced into a RF amplifier 524 which in turn is coupled to a duplexor 526. Duplexor 526, having been enabled for transmit mode by disabling receive enable signal 528, drives an RF output signal through receiver 204 (FIG. 2) and antenna 206 (FIG. 2) to a suitable antenna in a host computer 232 (FIG. 2).

Referring now to receive side 502, duplexor 526 includes a second port which is coupled to an RF filter 552 whose output is introduced into an amplifier 554. The output of amplifier 554 is introduced into RF down converter 550 whose output is introduced into a intermediate frequency (IF) filter 556. RF down converter 550 uses the RF output signal from RF oscillator 516 in transmit side 500 to down convert received RF signals to an intermediate frequency.

The output of intermediate frequency filter 556 is introduced into an intermediate frequency amplifier 558 whose output is coupled to demodulator 560. Intermediate frequency filter 556 and amplifier 558 isolate the portion of the spectrum associated with received data for demodulation by demodulator 560. The output of demodulator 560 is coupled to de-spreader 562 whose output is coupled to a receive data (RXDATA) port 564 for transmission to controller 210 (FIG. 2). Demodulator 560 removes a spread baseband data signal from an intermediate frequency carrier wave, while de-spreader 562 removes the spreading sequence, resulting in baseband data on RXDATA port 564.

In order to receive data transmissions, controller 210 (FIG. 2) asserts a disable signal on receive enable signal 528, switching the common connection of duplexor 526 to couple received RF signals from antenna 206 (FIG. 3) to the input of RF filter 552. The received RF signals are filtered and amplified by RF filter 552 and amplifier 554 before introduction into RF down converter 550. RF down converter 550 utilizes the RF oscillator 516 output signal to down convert the received RF signal producing an intermediate frequency signal output. The intermediate frequency output signal is filtered and amplified by RF filter 556 and 558, respectively, before being introduced into demodulator 560. Demodulator 560 removes the intermediate frequency carrier providing a spread data signal to de-spreader 562. De-spreader 562 performs an inversion of the spreading process performed by spreader 512 resulting in baseband (clear text) data at the RXDATA port 564.

Figure 6:
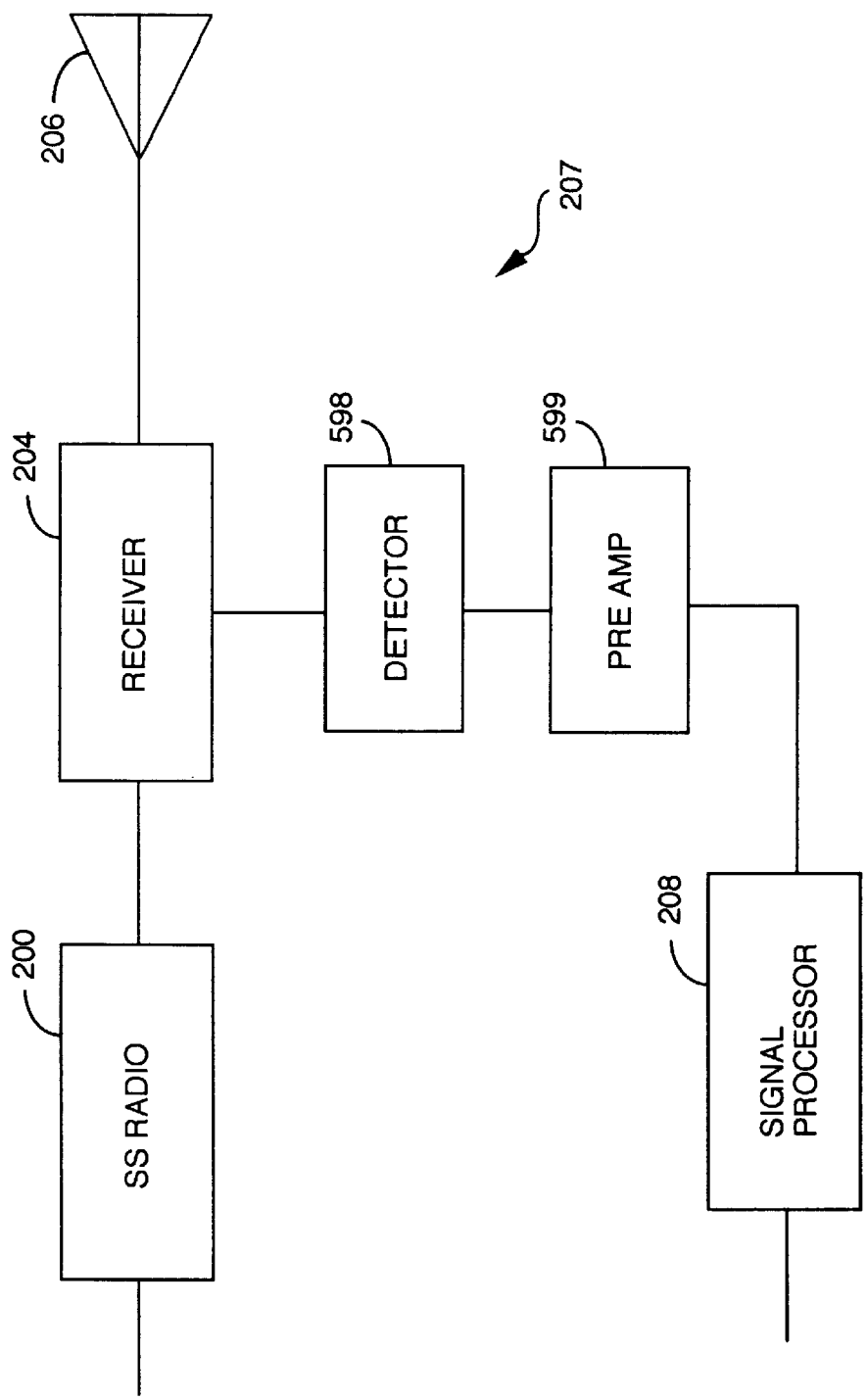
FIG. 6 is a schematic diagram of a receive portion of the reader of FIG. 3 for receiving and processing RF return signals from an electronic tag according to one embodiment of the present invention.

Referring now to FIG. 6, a block diagram for a receive portion of reader 50 (FIG. 2) associated with detecting radio frequency data transmitted from electronic tag 18 (FIG. 2) is shown. Modulated RF signals returned from electronic tag 18 (FIG. 2) are coupled by antenna 206 to receiver 204. The modulated RF signals are detected by a detector, generally indicated at 207.

Figure 7:
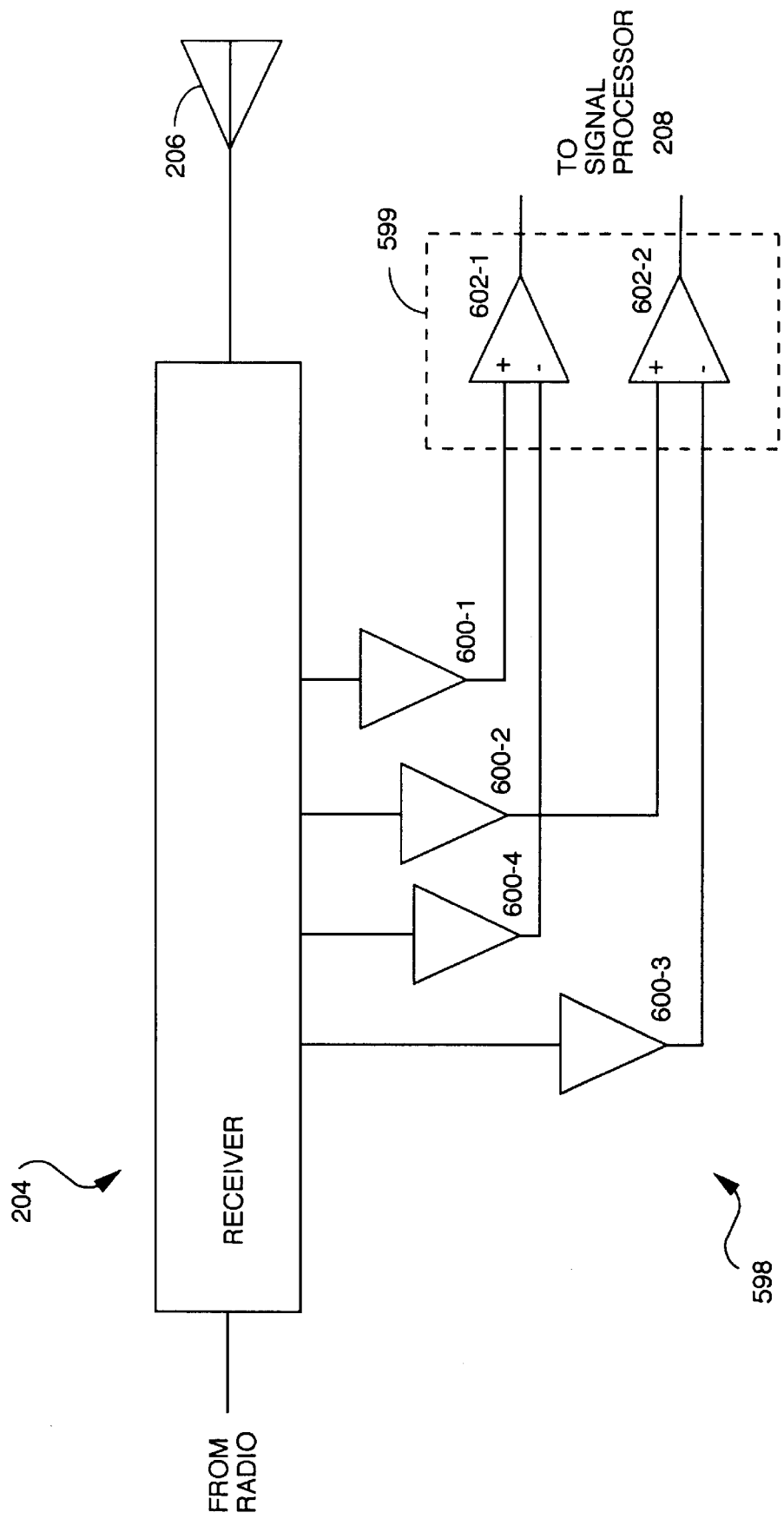
FIG. 7 is a schematic diagram of the detector and preamplifier of FIG. 6 according to one embodiment of the present invention.

In one embodiment, detector 207 is comprised of detector diodes 598 and preamplifiers 599. Referring to FIG. 7, in one embodiment, detector 598 is comprised of four diode detectors 600-1 through 600-4 spaced at 45° intervals, respectively, along a transmission line associated with receiver 204. Outputs from the diode detectors 600-1 through 600-4 are coupled through a signal conditioner (preamplifier) generally indicated at 599. In one embodiment, signal conditioner includes a bandpass filter and a high gain bandpass amplifier. Alternatively, a preamplifier only may be used. In one embodiment, diode detectors are part no. HSMS2802, produced by Hewlett-Packard, Inc.

Preamplifier 599 includes two differential amplifiers 602-1 and 602-2. The outputs of detector 600-1 through 600-4 are connected to the inputs of differential amplifier 602-1 through 602-2 in a manner such that each differential amplifier includes inputs offset by 90°. Specifically, the output of detector 600-1 is provided as an input to the positive input terminal while the output of detector 600-4 is provided to the negative input terminal of the differential amplifier 602-1. The output of detector 600-2 is provided as an input to the positive input terminal while the output of detector 600-3 is provided as an input to the negative input terminal of differential amplifier 602-2.

Alternatively, directional couplers or circulators may be utilized to detect the modulated RF signals. In one embodiment, the detector includes a double balanced mixer, the double balanced mixer receiving as inputs the interrogation signal and the radio frequency signal returned from the electronic tag, and providing an output signal representative of the identification information returned by the electronic tag. In another embodiment, the detector includes a directional coupler, a detector diode and a differential amplifier. In this configuration, the directional coupler is responsive to the interrogation signal and provides an output signal to a first input of the differential amplifier. The detector diode is responsive to the returned radio frequency signal provided by the electronic tag and provides an output signal to a second input of the differential amplifier. Finally, the differential amplifier provides an output signal representative of the identification information returned by the electronic tag.

Detector 598 above has been described in relationship to a two channel system. Specifically, two separate channels of data are provided to signal processor 208 (FIG. 6) associated with the data returning from electronic tag 18 (FIG. 2). Each channel is approximately 90° out of phase from the other. The two channel system was selected to eliminate the possibility of an interference condition arising at the receiver due to destructive interference of the transmitted interrogation signal and the electronic tag return signal. Alternatively, other channel configurations for detector 207 (FIG. 2) may be realized, depending on the performance required in the reader 50 (FIG. 2). Specifically, a single channel system may be implemented for detector 598. While interference regions may arise, the overall complexity and power consumption for reader 50 (FIG. 2) will be reduced. In terms of operational performance, the interference regions may necessitate a user to reposition reader 50 (FIG. 2) in order to successfully read tag data.

The output of preamplifier 599 is coupled to signal processor 208 (FIG. 6). Signal processor 208 (FIG. 6) detects a frame marker associated with the beginning of a frame as well as decodes the identification information in the return signal provided by an associated electronic tag 18 (FIG. 1). In one embodiment, signal processor 208 (FIG. 6) detects frame information as well as decodes bit cycles of 20 kilohertz and 40 kilohertz cycle patterns generated from an electronic tag 18 (FIG. 1).

Figure 8:
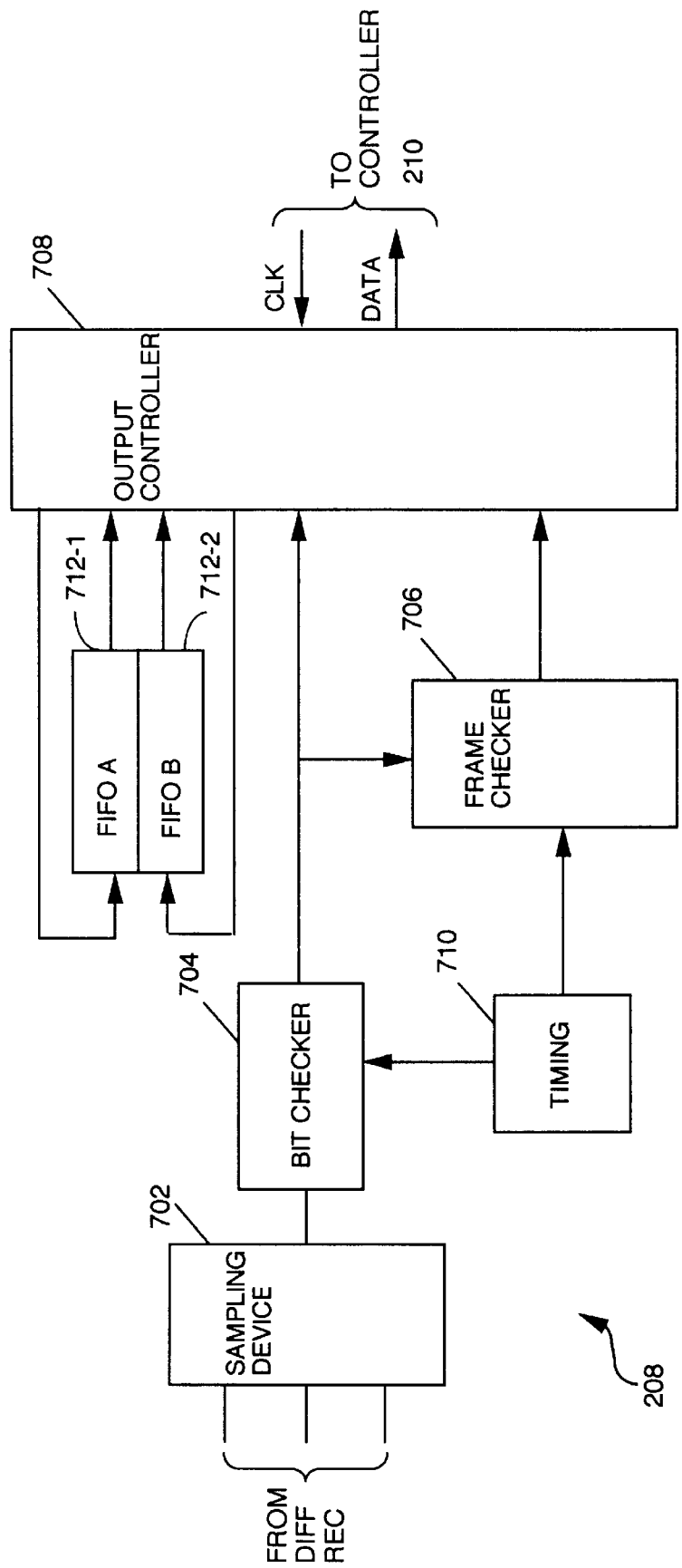
FIG. 8 is a schematic diagram of a signal processor according to one embodiment of the present invention.

Referring to FIG. 8, a detailed view of signal processor 208 is shown, including sampling device 702, bit checker 704, frame checker 706, output controller 708, and timing element 710. Associated with output controller 708 are first and second first in-first out (FIFO) buffers 712-1 and 712-2. Sampling device 702 receives inputs from preamplifier 599 (FIG. 7) and samples the two channels looking for interference conditions in either. Sampling device 702 provides a single data stream input representative of the received data to bit checker 704.

Bit checker 704 determines the presence of a valid data bit. Specifically, bit checker 704 checks for predetermined sequences of 20 kilohertz and 40 kilohertz cycle signals associated with a valid "0" or "1" data bit (two 20 kilohertz cycles followed by 40 kilohertz cycle for a "1", and one 20 kilohertz cycle followed by two 40 kilohertz cycles for a "0"). If the bit is valid, the bit is transferred to output controller 708. Frame checker 706 includes a register (not shown) for keeping track of the most recent data in order to identify the beginning of a new frame of data. In a preferred embodiment, frame checker 706 includes a FIFO (not shown) which is 128 bits in length for storing consecutive bits provided by bit checker 704. Frame checker 706 compares values stored in the FIFO for a match with a predetermined frame marker stored in a second register (not shown) in frame checker 706. Upon the identification of a valid frame marker, frame checker 706 outputs an interrupt to output controller 708, indicating that a valid frame marker been detected.

Output controller 708 receives the output bits generated by bit checker 704 and sequentially places each bit into a first one of FIFO buffers 712-1 and 712-2. Upon receipt of a valid frame marker interrupt from frame checker 706, output controller 708 begins a countdown associated with the completion of an entire frame of data. Output controller 708 continues to stuff data into a first one of the FIFO buffers 712-1 and 712-2 until a full frame has been transferred. At that time, output controller 708 generates an interrupt to controller 210 (FIG. 2) indicating that an entire frame of data has been received and is ready for processing. Thereafter, output controller 708 loads any new data received from bit checker 704 into a second one of FIFO buffers 712-1 and 712-2.

Accordingly, controller 210 (FIG. 2) must service the interrupt from output controller 708 prior to the second FIFO filling to assure no data will be lost. Upon receipt of a clock signal from controller 210 (FIG. 2), the contents of the first FIFO will be loaded to controller 210 (FIG. 2).

In one embodiment, the decoding and processing of received RF signals is performed in software as opposed to the hardware solution described above. Referring now to FIG. 9 through 14, a schematic diagram of a signal processor and flow diagrams associated with routines performed thereby are presented for implementing software signal processing of received RF modulated data from an electronic tag.

Figure 9:
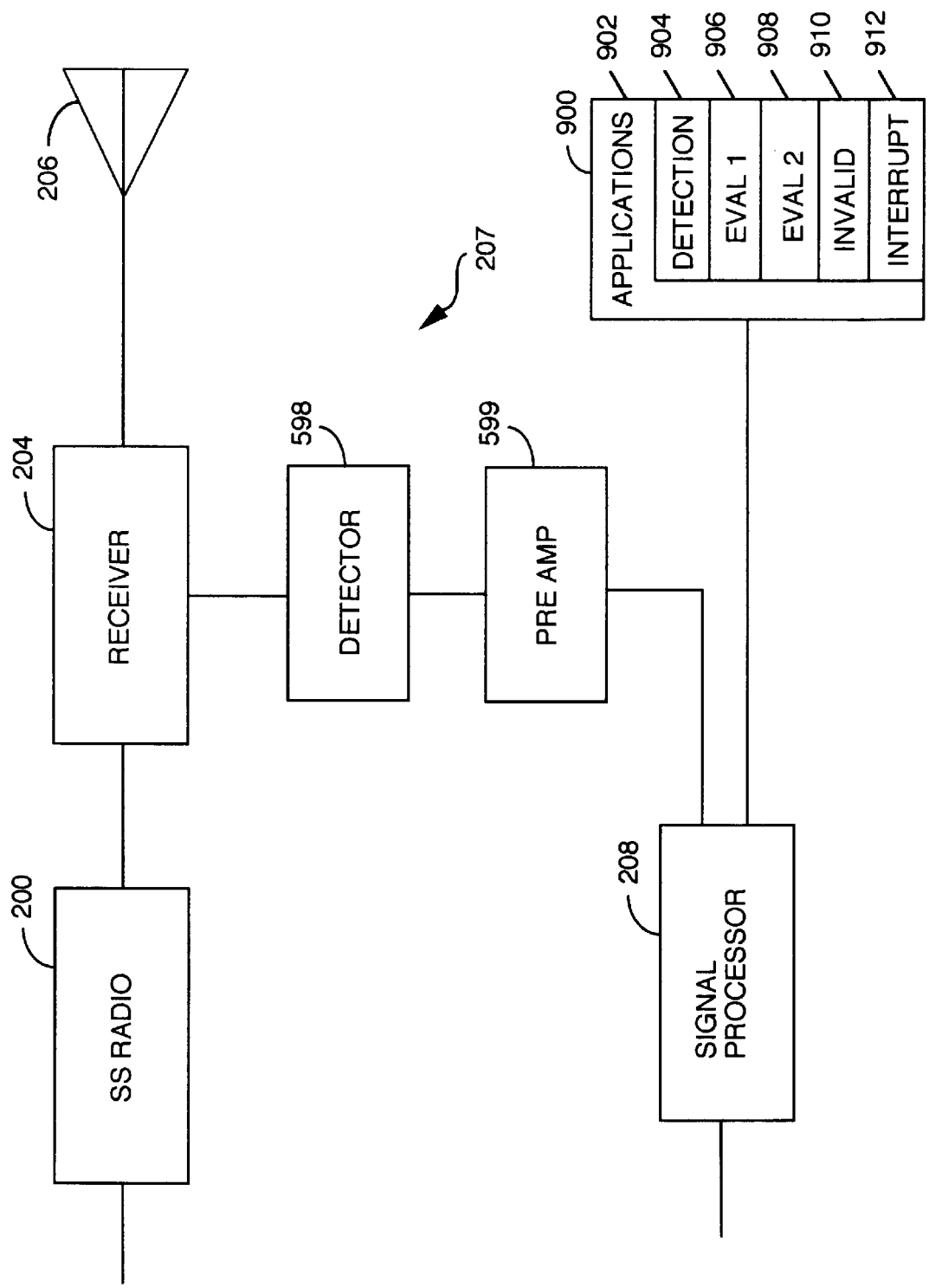
FIG. 9 is a schematic diagram of a signal processor according to one embodiment of the present invention.

Referring to FIG. 9, signal processor 208 has associated with it a memory 900 for storing applications 902. Applications 902 include a detection routine 904, a first evaluation cycle 906, a second evaluation cycle 908, an invalid data routine 910, and an interrupt routine 912.

In one embodiment, the output from preamplifier 599 in each channel is processed simultaneously. Alternatively, a single channel of data may be processed, with the second channel of data stored in a FIFO buffer (not shown) for processing only in the event an interference condition arises. In either system, the basic processing of data is the same. Details associated with a two channel system having a primary and secondary data channel will be described below. The data collection for either the primary or secondary data channel is substantially the same, with any differences highlighted below. Specifically, a data stream associated with a channel in preamplifier 599 is coupled to signal processor 208 for decoding.

Figure 10:
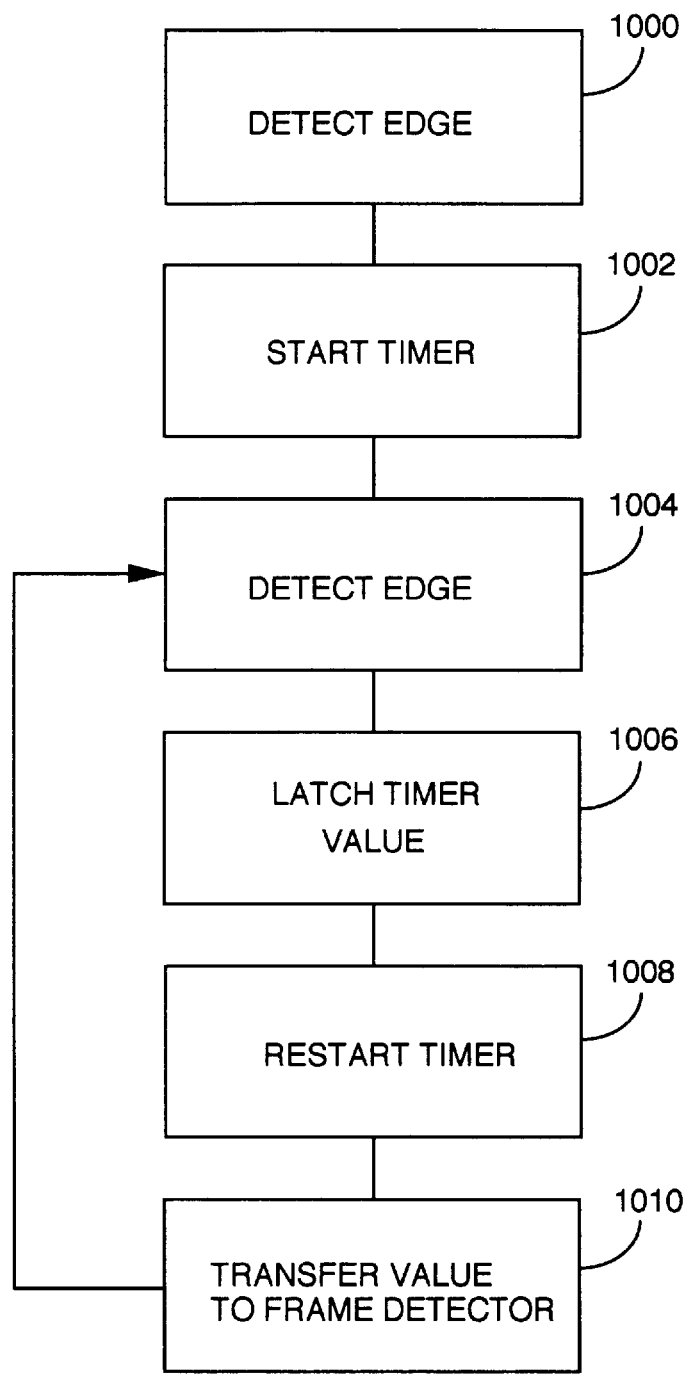
FIG. 10 is a flow diagram of a detection routine according to one embodiment of the present invention.

Referring to FIG. 10, a flow diagram associated with detection routine 904 is shown. Signal processor 208 (FIG. 9) receives a data signal for processing from preamplifier 599 (FIG. 9) and detects (1000) rising or falling edges in the signal. Both rising and falling edge detection is performed because the data received back from the electronic tag 18 (FIG. 2) may be inverted. Accordingly, detection of a rising or falling edge is required in order to identify the 20 and 40 kilohertz cycle signals.

After a first edge is detected, a first timer is started (1002). Upon the detection (1004) of a next edge, the value (cycle data) in the first timer is latched (1006) to a temporary storage buffer. The first timer is restarted (1008) and the cycle data indicative of the time between detected edge transitions is transferred (1010) to the bit checker 704 (FIG. 8). Upon the detection of the next edge, the value in the timer is latched for transfer to a frame detection routine. In this embodiment a single timer is used to facilitate the latching of data for transfer to an associated routine. Alternatively, two timers may be used.

Figure 11:
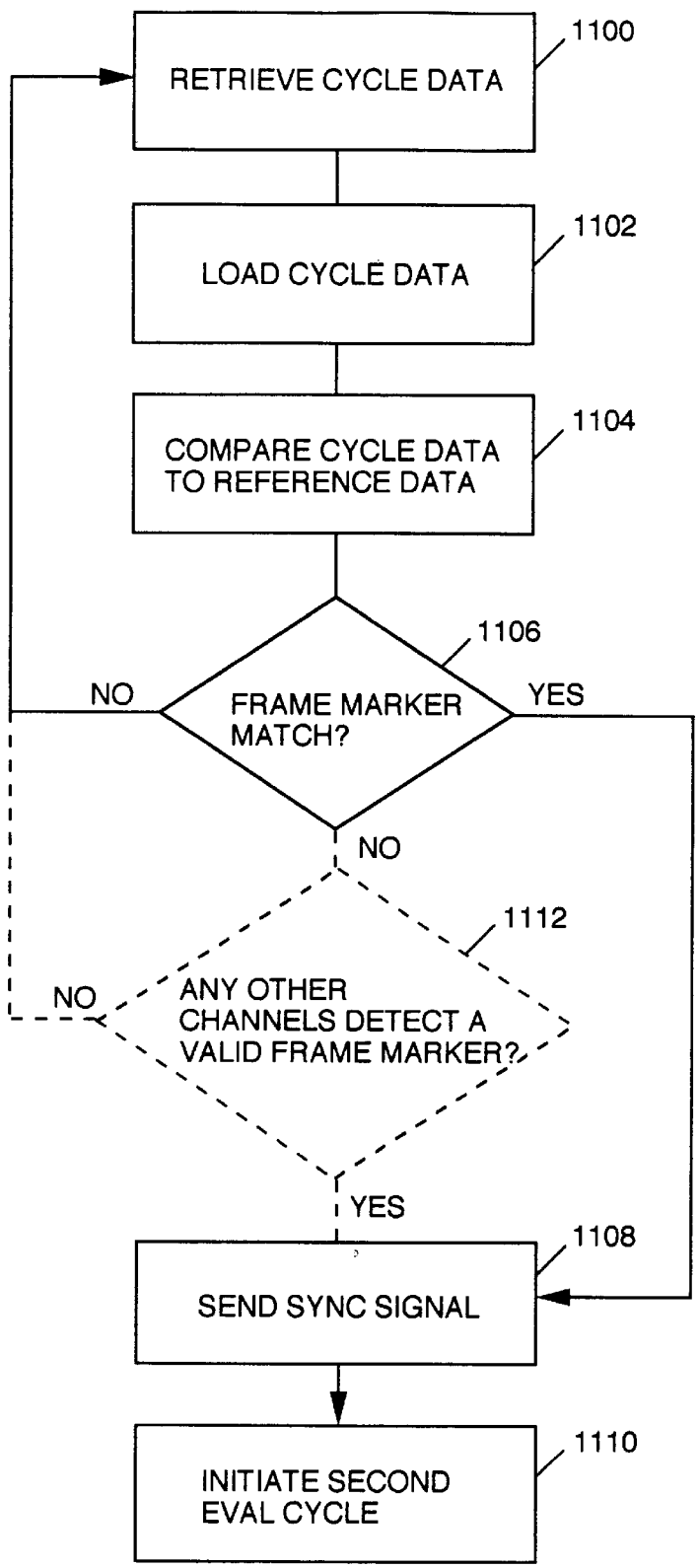
FIG. 11 is a flow diagram for a first evaluation cycle for detecting frame markers according to one embodiment of the present invention.

Referring now to FIG. 11, a first evaluation cycle 906 commences upon the receipt of cycle data derived from detection routine 904 (FIG. 9). Specifically, cycle data is retrieved (1100) from detection routine 906 (FIG. 9). The cycle data is loaded (1102) into a FIFO buffer which contains a sequence of cycle data. The sequence of cycle data is compared (1104) to a reference data which is a predefined frame marker sequence. If no match is detected, then the process restarts upon the next cycle data input. If a frame marker match is detected (1106), then a second evaluation cycle 908 (FIG. 9) is initiated (1110).

In a multichannel signal processing system, an additional step of synchronizing the retrieval of data between channels is performed prior to beginning the second evaluation cycle 908 (FIG. 9). Specifically, a frame synchronization signal is sent (1108) to each of the other channel data processors to synchronize the start of a data frame across the channels in a multichannel system. In multichannel systems, where two or more data channels are processed simultaneously, if no frame marker match is detected at step (1106), then a check (1112) is made to determine if another channel has detected a frame marker match. Upon receipt of a frame marker match signal from a secondary channel, then a frame synchronization signal is transmitted (1108) to synchronize data collection in secondary channels, and the second evaluation cycle is initiated (1110).

Figure 12:
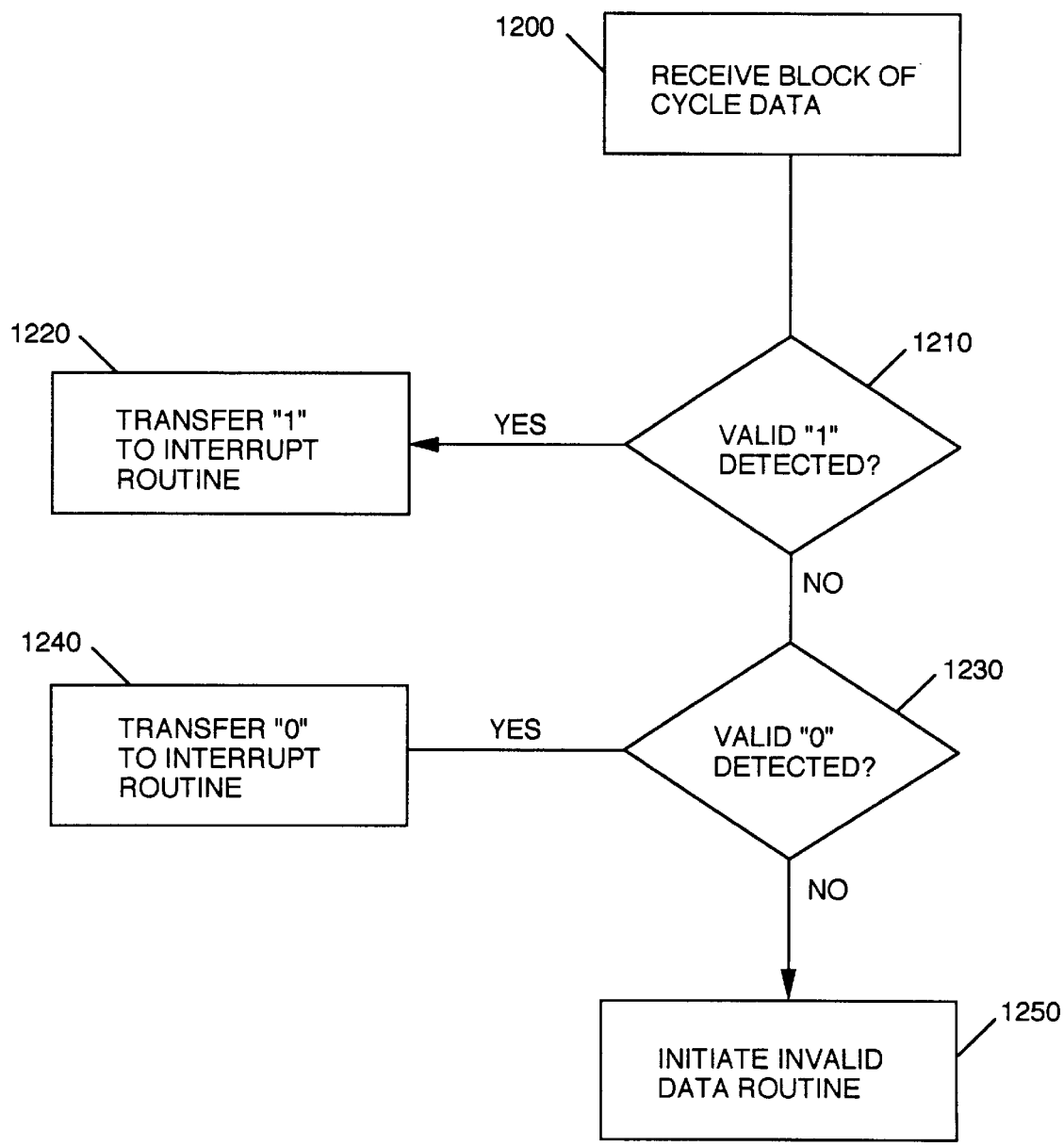
FIG. 12 is a flow diagram for a second evaluation cycle for detecting valid data bits according to one embodiment of the present invention.

Second evaluation cycle 908 (FIG. 9) decodes valid data bits from cycle data retrieved by detector routine 904 (FIG. 9). Referring now to FIG. 12, after detection of a frame marker, blocks of three cycle data transfers are received (1200) and presented for evaluation to second evaluation cycle 908 (FIG. 9). A determination is made if the combination of the three cycle data transfers matches a predetermined sequence representative of a binary "1" or "0". Specifically, in one embodiment, a validity check (1210) is made if the three cycle data transfers correspond to two 20 kHz signals followed by a 40 kHz signal. If so, then a valid binary "1" data bit is transferred (1220) to the interrupt routine 912 (FIG. 9) for processing. If no match is detected, then a check (1230) is made if the three cycle data transfers correspond to one 20 kHz signals followed by two 40 kHz signals. If so, then a valid binary "0" data bit is transferred (1240) to interrupt routine 912 (FIG. 9) for processing. If no match is again detected, then invalid data routine 910 (FIG. 9) is initiated (1250). Each three cycle transfer block detected after a valid frame marker has been decoded is processed in this manner until the end of a frame of data is reached. Thereafter, the frame identification process, as described above in association with first evaluation cycle 904 (FIG. 9), is initiated searching for the beginning of the next frame of data for processing.

Referring to FIG. 9, one embodiment of the present invention, the detection routine 904, first evaluation cycle 906, and second evaluation cycle 908 are executed simultaneously for each channel of data available for processing. However, only one data channel (primary data channel) provides a data stream to the interrupt routine 912 for processing. The secondary data channels temporarily store valid bits, for use in association with the invalid data routine 912 as discussed below, but are not required to transfer any data to interrupt routine 912.

Figure 13:
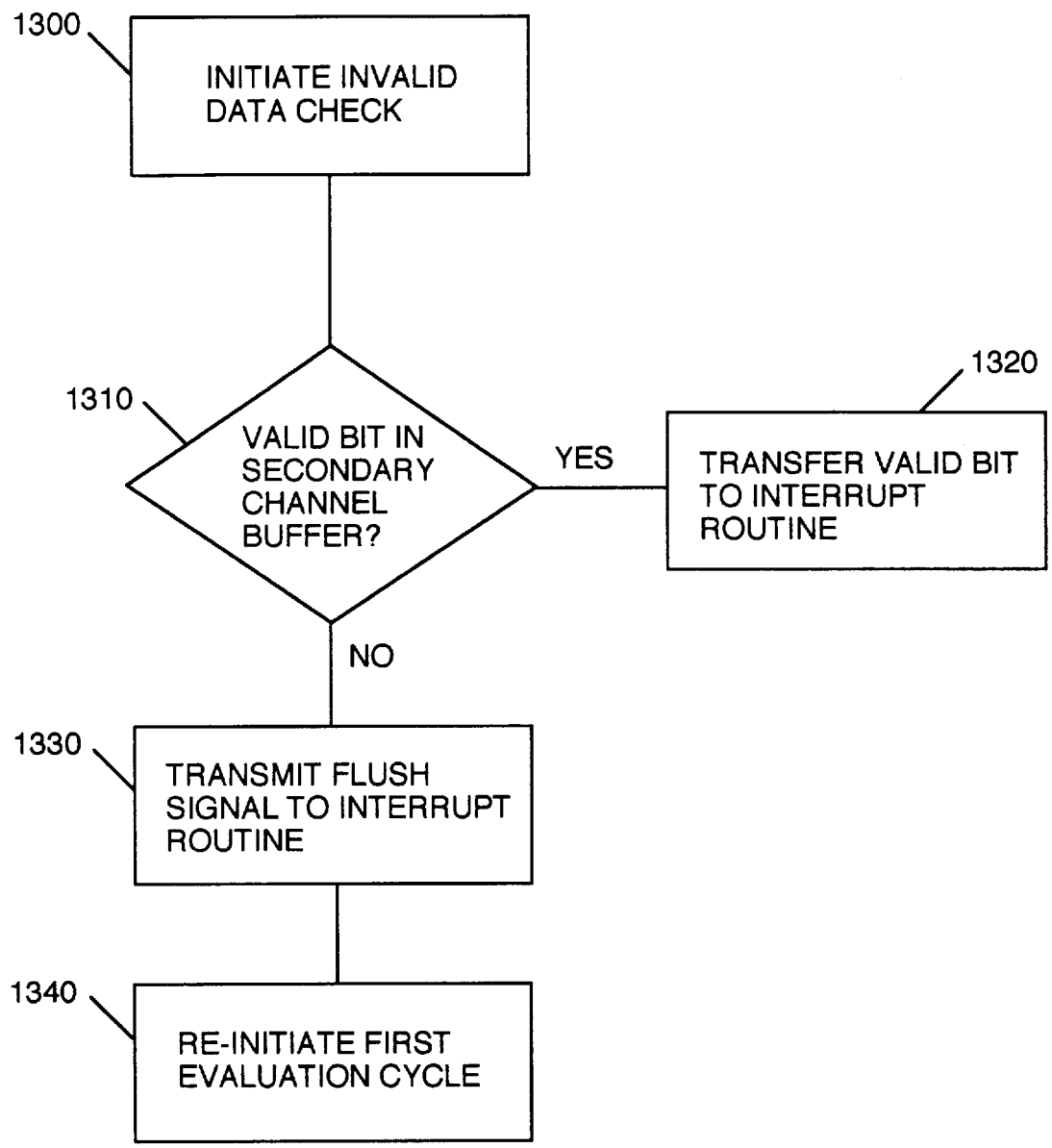
FIG. 13 is a flow diagram of a invalid bit routine for recovering from an interference condition in a primary data channel according to one embodiment of the present invention.

Referring now to FIG. 13, the process associated with validating an invalid data bit detected in the middle of a frame in the primary data channel is shown. In a multichannel system, an interference condition may arise in the primary data channel due to the destructive interference of the interrogating RF signal generated by reader 50 (FIG. 2), and modulated RF signals returned by the electronic tag 18 (FIG. 2). Invalid bits detected as part of the second evaluation cycle 908 (FIG. 9) may reflect an interference condition and not the true state of the data returned from the electronic tag. Accordingly, upon the detection (1300) of an invalid bit of data, a check is made in one or more of the secondary data channels to determine if a valid binary "1" or "0" has been detected. This is accomplished by having each secondary data channel store a detected valid bit in a temporary buffer, until the next valid data bit has been detected. Accordingly, in one embodiment a single bit buffer is used to store this "duplicate" data derived in each of the secondary channels.

Specifically, a check (1310) is made of the single bit buffer in a secondary data channel to determine if a valid bit in the secondary channel buffer has been decoded. If a valid bit has been decoded, then the data value of the valid bit is transferred (1320) to interrupt routine 912 (FIG. 9) for further processing. Alternatively, if no valid bit has been detected in this secondary channel, then a flush signal is transmitted (1330) to interrupt routine 912 (FIG. 9) and the first evaluation cycle 906 (FIG. 9) is re-initiated (1340) to search for another valid frame marker. The details of the flush signal will be described in greater detail below in association with the interrupt routine 912 (FIG. 9).

For the purposes of this discussion, frame search is re-initialized upon the detection of a single invalid bit in a frame. Alternatively, re-initialization may occur after the occurrence of two or more invalid data bits depending on the performance requirements established for reader 50 (FIG. 2).

Figure 14:
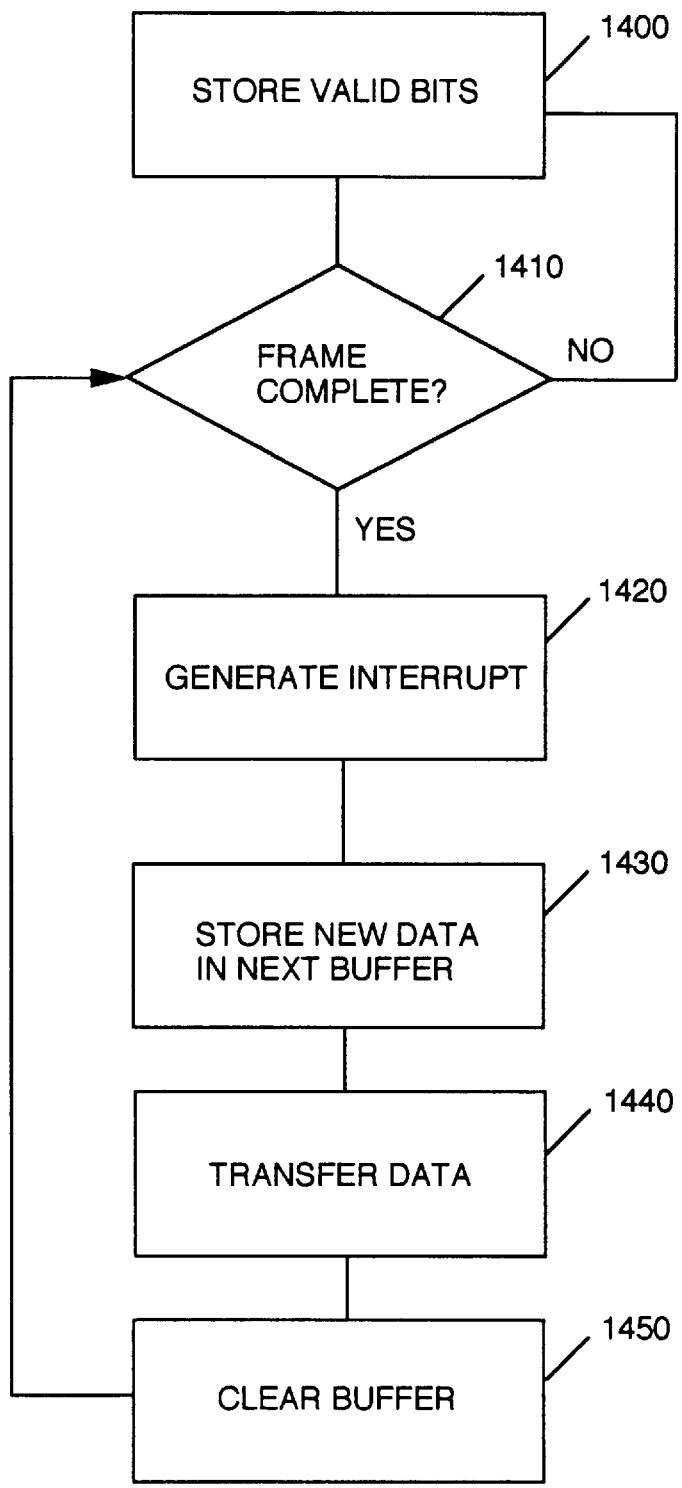
FIG. 14 is a flow diagram for an interrupt routine for transferring data from the signal processor to a controller in the reader for further processing according to one embodiment of the present invention.

Interrupt routine 912 (FIG. 9) temporarily stores valid data bits received and generates an interrupt for servicing by controller 210 (FIG. 2) upon decoding a complete frame of data. Referring to FIG. 14, each valid bit received from the primary data channel is stored (1400) in a temporary buffer. Upon the receipt of a new valid bit, a check (1410) is made to determine if the frame is complete. If the frame is complete, then an interrupt (1420) is generated and sent to controller 210 (FIG. 2), while any new valid data bits are stored (1430) in a second temporary buffer. Upon receipt of a clock signal from controller 210 (FIG. 2), the frame of data is transferred (1440) to controller 210 (FIG. 2). Thereafter, the temporary buffer is cleared (1450). In one embodiment, prior to checking to see if the temporary buffer is full (indicating a complete frame of data has been decoded) in step 1410, a check is made to see if a flush signal has been received. If so, then the temporary buffer is cleared. This process repeats, alternating storage in the pair of temporary buffers.

In one embodiment signal processor 208 (FIG. 2) is a separate processor as described above. Alternatively, signal processor may be incorporated into controller 210 (FIG. 2). In this alternative embodiment, associated applications 902 (FIG. 9) may be stored in memory 212 (FIG. 2).

Referring again to FIG. 3, after the receipt of a frame of data from signal processor 208, controller 210 may display the frame of data on display 300. As was disclosed above, memory 212 includes one or more executable sub routines associated with handling data. Specifically, a display routine 308 will display the frame data decoded for reading by a user. Alternatively, storage routine 310 may be invoked to store the frame of data for uploading at a future time. A comparison routine 312 may be initiated to compare the retrieved frame data with a predetermined list of frame sequences stored in memory 212 to determine if the frame data is associated with a desired object. The frame information may be transmitted to a host computer for further processing as is required by executing the upload routine 314. Alternatively, a download routine 316 may be executed to download information to transponder 18 (FIG. 2).

Referring to FIG. 5, the upload routine begins by disabling receive enable signal 528 to spread spectrum radio 200 (FIG. 2) (by controller 210 in FIG. 6). The baseband data is introduced to TXDATA port 510 which in turn is coupled to an input of a modulator 511 whose output is coupled to a spreader 512. The baseband information received at TXDATA port 510 is modulated by modulator 511, resulting in an intermediate frequency (IF) signal which is the combination of the baseband data and an IF carrier. Spreader 512 combines the IF signal with a spreading signal resulting in a spread IF signal. The output of spreader 512 is coupled to RF oscillator 516 whose output is introduced into a RF amplifier 524 which in turn is coupled to a duplexor 526. Duplexor 526, having been enabled for transmit mode by disabling receive enable signal 528, drives an RF output signal through receiver 204 (FIG. 2) and antenna 206 (FIG. 2) to a suitable antenna in a host computer 232 (FIG. 2).

ALTERNATIVE EMBODIMENTS

In one embodiment of the invention, a prepackaged wireless LAN connection device is modified to generate interrogation signals and read modulated RF signals returned from an electronic tag, while maintaining the capability of transmitting and receiving information from a host computer through a single radio structure. Specifically, a Wavelink 3000 portable terminal, manufactured by Wavelink Technologies, Inc., is modified to include a receiver 204 (FIG. 2), detector 207 (FIG. 2), signal processor 208 (FIG. 2), associated memory 900 (FIG. 9) and templates 306 (FIG. 3) including display, storage, comparison and downloading and uploading routines 308, 310, 312, 314 and 316 (FIG. 3) respectively as described above. In this embodiment a narrow band UHF-FM, a 902–928 MHz spread spectrum, or a 2400–2500 MHz spread spectrum radio is used. A base unit, part number Wavelink base station 7000, manufactured by Wavelink Technologies, Inc., may be used as a host computer for receipt of object data transmitted from the modified Wavelink 3000 terminal.

In another embodiment, radio 200 (FIG. 2) may be a frequency hopping spread spectrum radio, a direct sequence spread spectrum radio, narrow band UHF-FM radio or other radio as is known in the art.

The present invention has been described in terms of one or more embodiments. The invention, however, is not limited to the embodiments depicted and described. Rather, the scope of the invention is defined by the claims which follow.

What is claimed is:

1. An apparatus for reading data from an electronic tag comprising;
    an antenna;
    a source for generating a radio frequency interrogation signal;
    a transceiver for transmitting the radio frequency interrogation signal to the electronic tag through the antenna and for receiving a radio frequency signal returned from the electronic tag including encoded data;
    a signal processor for processing the radio frequency signal returned from the electronic tag and for decoding the encoded data received from the electronic tag;
    a modulator for combining the decoded data and the radio frequency interrogation signal for transmission by the transceiver to a remote host unit; and
    a portable housing adapted to accommodate the antenna, the transceiver, the source, the signal processor and the modulator to allow for identification of objects at locations removed from the remote host unit.

2. The apparatus of claim 1 wherein the interrogation signal is not modulated.

3. The apparatus of claim 1 wherein the transceiver is a homodyne transceiver.

4. The apparatus of claim 3 further including a detector for detecting the returned radio frequency signal.

5. The apparatus of claim 4 wherein the detector is a single channel detector.

6. The apparatus of claim 4 wherein the detector includes two or more channels.

7. The apparatus of claim 4 wherein the detector includes a double balanced mixer, the double balanced mixer receiving as inputs the radio frequency interrogation signal and the radio frequency signal returned from the electronic tag and providing an output signal representative of the identification information returned by the electronic tag.

8. The apparatus of claim 4 wherein the detector includes a directional coupler, a detector diode and a differential amplifier, the directional coupler, responsive to the interrogation signal, providing an output signal to a first input of the differential amplifier, the detector diode, responsive to the returned radio frequency signal provided by the electronic tag, providing an output signal to a second input of the differential amplifier, and the differential amplifier providing an output signal representative of the identification information returned by the electronic tag.

9. The apparatus of claim 4 wherein signal processor includes a signal conditioner, the detector outputting a first signal representative of the data in the electronic tag which is coupled to the signal conditioner, the signal conditioner amplifying the first signal prior to processing by the signal processor.

10. The apparatus of claim 9 wherein the signal conditioner includes a bandpass filter and a high gain bandpass amplifier.

11. The apparatus of claim 9 wherein the signal processor includes:
    a bit detector for detecting valid and invalid bits in the first signal;
    a first buffer having a first size for storing detected valid and invalid bits associated with the first signal;
    a frame detector for identifying a frame marker from a most recent sequence of bits stored in the first buffer; and
    means for outputting a frame of data for processing after a predetermined amount of time has expired following the identification of the frame marker.

12. The apparatus of claim 11 wherein the bit detector includes
    an edge detector for determining a transition edge in the first signal;
    a timer for measuring time between successive edges detected by the edge detector, the measured time defining a timer cycle;
    a memory for storing a plurality of sequences of timer cycles, one for each valid bit; and
    a comparator for comparing a predetermined number of timing cycles with the plurality of sequences, and upon a match, outputting a valid bit, otherwise outputting an invalid bit.

13. The apparatus of claim 12 wherein the detector includes two data channels, the second data channel outputting a second signal representative of the data in the electronic tag, the first and the second channels being separated by a predetermined phase angle.

14. The apparatus of claim 13 wherein the phase angle is 45 degrees.

15. The apparatus of claim 13 wherein the signal processor simultaneously processes the first and the second signals, the signal processor including a second buffer having a second size for storing the valid and invalid bits associated with the second signal, and means for replacing an invalid bit stored in the first buffer with an associated bit in the second buffer if the associated bit is a valid bit.

16. The apparatus of claim 13 wherein the signal processor includes a second buffer having a second size for storing the valid and invalid bits associated with the second signal, and means for replacing an invalid bit stored in the first buffer with an associated bit in the second buffer if the associated bit is a valid bit.

17. The apparatus of claim 1 wherein the source is a direct sequence spread spectrum source.

18. The apparatus of claim 1 wherein the antenna is a directional antenna.

19. The apparatus of claim 1 wherein the antenna includes a omnidirectional antenna, a directional antenna and means for coupling the transceiver to the omni-directional antenna during uploading operations and coupling the directional antenna to the transceiver during tag reading operations.

20. The apparatus of claim 19 wherein the omni-directional antenna is a whip antenna.

21. The apparatus of claim 1 further including a user interface for receiving commands and a user display for displaying status information associated with read, uploading and downloading operations.

22. The apparatus of claim 1 wherein the portable housing is a hand-held enclosure wherein the source, transceiver, signal processor and modulator are disposed within the hand-held enclosure.

23. An object identification system comprising:
   an electronic tag including identification information, and means for encoding the identification information and reflecting a radio frequency signal including the encoded identification information; and
   a portable reader including
      an antenna;
      a source for generating a radio frequency interrogation signal;
      a transceiver for transmitting the radio frequency interrogation signal to the electronic tag through the antenna and for receiving the reflected radio frequency signal returned from the electronic tag;
      a signal processor for processing the reflected radio frequency signal to decode the encoded identification information from the electronic tag;
      a modulator for combining the decoded identification information and the radio frequency interrogation signal for transmission by the transceiver to a remote host unit; and
   a portable housing adapted to accommodate the antenna, the transceiver, the source, the signal processor and the modulator to allow for identification of objects at locations removed from the remote host unit.

24. A method of identifying an object by a reader comprising the steps of:
   providing a reader including a transceiver for generating a first radio frequency signal for interrogation of an electronic tag associated with an object;
   transmitting by the transceiver the first radio frequency signal to the electronic tag;
   receiving a modulated radio frequency signal at the transceiver from the electronic tag responsive to the first radio frequency signal, the modulated radio frequency signal including encoded identification information associated with the electronic tag;
   decoding the identification information;
   modulating the first radio frequency signal using the decoded identification information;
   transmitting by the transceiver the modulated first radio frequency signal to a remote host.

25. A method of identifying an object by a reader comprising the steps of:
   providing an object identification reader including a transceiver for receiving and transmitting radio frequency signals;
   receiving at the transceiver request data including object identification data from a host for facilitating the identification of an object;
   decoding the request data;
   transmitting by the transceiver a first signal to an electronic tag associated with the object;
   receiving a modulated radio frequency signal at the transceiver from the electronic tag responsive to the first signal, the modulated radio frequency signal including encoded information associated with the object including object identification data;
   decoding the encoded information;
   comparing the decoded information with the decoded request data, and if the object has been requested by the host then
      modulating the first signal by combining the first signal and the decoded information; and
      transmitting by the transceiver the modulated first signal to the host.

26. The method of claim 25 wherein the object identification data includes an object identifier and the step of decoding the identification information includes comparing the decoded identification information with the object identifier to determine if the object being interrogated is being sought by the host.

27. An portable electronic tag reader adapted to receive instructions from a remote host, interrogate electronic tags and relay data retrieved from the tags to the remote host, the portable reader comprising;
   an antenna;
   a radio frequency source for generating a radio frequency interrogation signal;
   a transceiver for receiving instructions from the remote host via the antenna, for transmitting the radio frequency interrogation signal to an electronic tag through the antenna and for receiving a radio frequency signal returned from the electronic tag including encoded data;
   a signal processor for processing instructions from the remote host, for initiating the interrogation of an electronic tag and for processing the radio frequency signal returned from the electronic tag to decode the encoded data;
   a modulator for combining the decoded data and the radio frequency interrogation signal for transmission by the transceiver to the remote host; and
   a portable housing adapted to accommodate the antenna, the transceiver, the source, the signal processor and the modulator to allow for identification of objects at locations removed from the remote host.

* * * * *